Nov. 19, 1940.  E. L. WIRTH ET AL  2,222,554

FISHHOOK

Filed Jan. 20, 1939

INVENTORS
E. L. WIRTH
G. E. WIRTH
BY
ATTORNEY

Patented Nov. 19, 1940

2,222,554

UNITED STATES PATENT OFFICE 2,222,554

FISHHOOK

Edward L. Wirth and George E. Wirth,
Portland, Oreg.

Application January 20, 1939, Serial No. 251,932

3 Claims. (Cl. 43—27)

This invention relates generally to the fisherman's art, and particularly to a fishhook which is especially adapted for use with salmon eggs and other frangible bait.

The main object of this invention is to construct a fishhook especially adapted for use in connection with a salmon egg bait.

The second object is to construct a hook whereby a cluster of salmon eggs may be easily and securely attached to a hook.

The third object is to construct a hook of the class described which will be easy to manufacture, low in cost and simple to apply the bait thereto.

These and other objects are accomplished in the manner set forth in the following specification as illustrated in the accompanying drawing, in which.

Similar numerals refer to similar parts throughout the several views.

Figure 4:
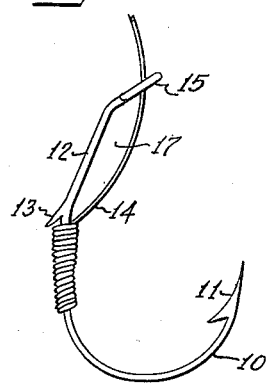
Fig. 4 is a side elevation of the hook itself and the attached leader.
Figure 5:
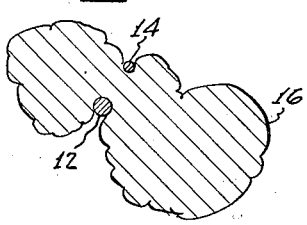
Fig. 5 is a section taken along the line 5—5 in Fig. 3.

Referring in detail to the drawing, there is shown a hook 10 having the usual point 11 and shank 12 from the latter of which extends the stop 13 which is preferably turned in the direction shown in Fig. 4 although not necessarily so. To the shank 12 between the stop 13 and the point 11 is secured the snell 14 whose running end passes freely through the eye 15 of the hook 10.

For the purpose of illustration there is shown a cluster of salmon eggs 16 which in practice normally surround the point 11 of the hook 10 and are then passed through the opening 17 formed between the snell 14 and the shank 12. Obviously, any tension on the snell 14 will cause the opening 17 to grow smaller and confine the portion of the cluster 16 which is held therein.

Figure 3:
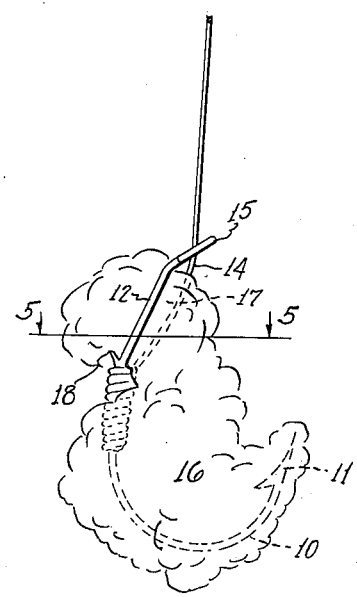
Fig. 3 is a view similar to Fig. 2 showing the leader drawn up tight against the bait.
Figure 1:
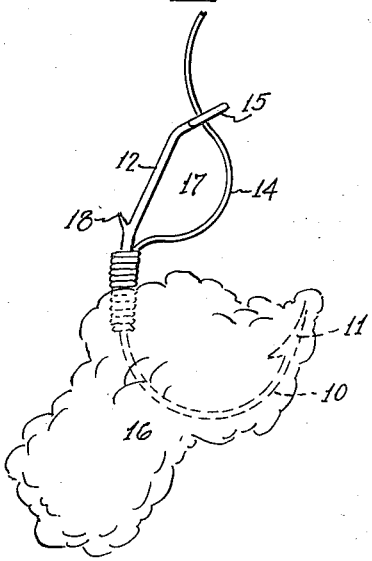
Fig. 1 is a side elevation of the hook showing the first step in applying the bait thereto.
Figure 2:
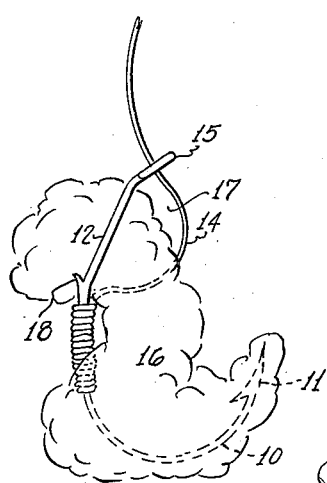
Fig. 2 is a view similar to Fig. 1 showing a portion of the bait drawn through the loop in the leader.

It will be noted in Figs. 1 to 3 that the stop 18 is turned in the opposite direction than is the stop 13 in Fig. 4. While the direction of turning is not important, it is somewhat preferable to have it turned as shown in Fig. 4 although it is customary to turn the stop 18 as shown in Figs. 1 to 3, inclusive, since it is commonly used to hold the bait on the hook instead of being used as a stop as is the case in the present instance.

Obviously, any other means for attaching the snell 14 to the hook 10 may be employed without departing from the spirit of this invention.

We claim:

1. In a fishhook of the class described a curved shank having a point at one end, an eye at the other end, and having a stop formed thereon between said eye and point together with a snell passing freely through said eye and secured to said shank between said stop and point in a manner to form a bait holding loop on the point side of said fishhook.

2. A fishhook of the class described having in combination a shank provided with a barbed point at one end and an open eye at the other end thereof, said shank having a stop formed thereon between the ends thereof and a snell passing freely through said eye and secured to said shank between said stop and point in a manner to form a free running loop between said eye and stop characterized by having said loop in the inner side of said shank.

3. A fishhook of the class described characterized by having a shank provided with a barbed point at one end and an eye at the other end and having a slice formed in said shank constituting a stop, a snell secured to said shank on the side of said stop adjacent to said point, said snell having its running end passing freely through said eye in a manner to form a free running loop between said eye and the middle of said shank.

EDWARD L. WIRTH.
GEORGE E. WIRTH.